US 7,774,708 B2

(12) United States Patent
Bell et al.

(10) Patent No.: US 7,774,708 B2
(45) Date of Patent: Aug. 10, 2010

(54) GRAPHICAL USER INTERFACE WITH IMPROVED MEDIA PRESENTATION

(75) Inventors: Chris Bell, Pacifica, CA (US); Alan Ward, Thornton, CO (US); Colin Meldrum, Berkeley, CA (US); Timothy Benjamin Martin, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 495 days.

(21) Appl. No.: 11/398,354

(22) Filed: Apr. 4, 2006

(65) Prior Publication Data

US 2007/0166687 A1 Jul. 19, 2007

Related U.S. Application Data

(60) Provisional application No. 60/756,511, filed on Jan. 4, 2006.

(51) Int. Cl.
*G06F 3/00* (2006.01)
(52) U.S. Cl. .................. 715/738; 715/740; 715/751
(58) Field of Classification Search .............. 715/764, 715/810, 835, 962, 734–747, 751, 759; 705/26, 705/27
See application file for complete search history.

(56) References Cited

U.S. PATENT DOCUMENTS

| | | | |
|---|---|---|---|
| 5,715,403 A | | 2/1998 | Stefik |
| 5,719,789 A | * | 2/1998 | Kawamata ................. 702/189 |
| 5,864,868 A | | 1/1999 | Contois |
| 5,963,915 A | | 10/1999 | Kirsch |
| 5,963,916 A | | 10/1999 | Kaplan |
| 6,226,618 B1 | | 5/2001 | Downs |
| 6,233,682 B1 | | 5/2001 | Fritsch |
| 6,236,971 B1 | | 5/2001 | Stefik et al. |
| 6,248,946 B1 | | 6/2001 | Dwek |
| 6,317,784 B1 | * | 11/2001 | Mackintosh et al. ......... 709/219 |
| 6,346,951 B1 | * | 2/2002 | Mastronardi ................ 715/716 |
| 6,385,596 B1 | | 5/2002 | Ansell et al. |

(Continued)

FOREIGN PATENT DOCUMENTS

EP 0 927 945 B1 7/1999

(Continued)

OTHER PUBLICATIONS

"Shop the First Online 99¢ Store", www.apple.com/music/store/shop.html, downloaded Sep. 24, 2003, pp. 1-2.

(Continued)

*Primary Examiner*—Tadeese Hailu

(57) ABSTRACT

Improved graphical user interfaces and techniques for providing remote media content to users are disclosed. According to one aspect, an application window display on a display device can expose a user not only to local media content but also to remote media content that is associated with the local media content. The local media content is stored locally, while the remote media content is stored remotely and available from a remote media server. According to another aspect, the remote media content to be displayed can be determined in a manner that is dependent on a user interaction with the local media content. According to still a further aspect, the manner by which the remote media content is displayed can be dependent on the availability of remote media content at the remote media server.

17 Claims, 13 Drawing Sheets

U.S. PATENT DOCUMENTS

| | | | |
|---|---|---|---|
| 6,446,080 B1 | 9/2002 | Van Ryzin et al. | |
| 6,452,609 B1 | 9/2002 | Katinsky et al. | |
| 6,731,312 B2 | 5/2004 | Robbin | |
| 6,941,324 B2* | 9/2005 | Plastina et al. | 707/104.1 |
| 6,976,265 B1 | 12/2005 | Yang et al. | |
| 7,062,468 B2 | 6/2006 | Hillegass et al. | |
| 7,209,892 B1 | 4/2007 | Galuten et al. | |
| 7,228,437 B2 | 6/2007 | Spagna et al. | |
| 7,340,451 B2 | 3/2008 | Sacco | |
| 7,345,234 B2* | 3/2008 | Plastina et al. | 84/615 |
| 7,358,434 B2* | 4/2008 | Plastina et al. | 84/615 |
| 2001/0033296 A1* | 10/2001 | Fullerton et al. | 345/730 |
| 2002/0002468 A1 | 1/2002 | Geisler et al. | |
| 2002/0016776 A1* | 2/2002 | Chu et al. | 705/52 |
| 2002/0026575 A1 | 2/2002 | Wheeler et al. | |
| 2002/0033844 A1 | 3/2002 | Levy et al. | |
| 2002/0138439 A1 | 9/2002 | Matsushima et al. | |
| 2003/0033331 A1* | 2/2003 | Sena et al. | 707/513 |
| 2003/0182139 A1 | 9/2003 | Harris et al. | |
| 2004/0003097 A1* | 1/2004 | Willis et al. | 709/228 |
| 2004/0236957 A1 | 11/2004 | Durand et al. | |
| 2004/0243482 A1 | 12/2004 | Laut | |
| 2004/0268451 A1 | 12/2004 | Robbin | |
| 2005/0021478 A1 | 1/2005 | Gautier | |
| 2005/0071780 A1 | 3/2005 | Robbin et al. | |
| 2005/0091302 A1* | 4/2005 | Soin et al. | 709/200 |
| 2005/0193094 A1 | 9/2005 | Robbin et al. | |
| 2005/0210509 A1* | 9/2005 | Jones | 725/46 |
| 2005/0240661 A1* | 10/2005 | Heller et al. | 709/219 |
| 2005/0268279 A1* | 12/2005 | Paulsen et al. | 717/110 |
| 2006/0026284 A1* | 2/2006 | Nguyen | 709/225 |
| 2006/0091203 A1* | 5/2006 | Bakker et al. | 235/381 |
| 2006/0100978 A1* | 5/2006 | Heller et al. | 707/1 |
| 2006/0123052 A1* | 6/2006 | Robbin et al. | 707/104.1 |
| 2006/0265409 A1* | 11/2006 | Neumann et al. | 707/100 |
| 2007/0093958 A1* | 4/2007 | Jonsson et al. | 701/211 |
| 2008/0168355 A1* | 7/2008 | Dunlap et al. | 715/733 |

FOREIGN PATENT DOCUMENTS

| | | |
|---|---|---|
| FR | A 2 827 981 | 1/2003 |
| JP | 11-161717 A | 6/1999 |
| JP | 2002-99466 | 4/2002 |
| JP | 2003-50745 | 2/2003 |
| WO | WO 99/27681 A | 6/1999 |
| WO | WO 00/43905 | 7/2000 |
| WO | WO 00/62265 | 10/2000 |
| WO | WO 01/41023 | 6/2001 |
| WO | WO 01/44908 | 6/2001 |
| WO | WO 01/46786 | 6/2001 |
| WO | WO 01/65526 A | 9/2001 |
| WO | WO 03/017213 | 2/2003 |
| WO | WO 03/023786 A2 | 3/2003 |

OTHER PUBLICATIONS

"The iTunes Music Store. Downloads Done Right", www.apple.com/music/store, downloaded Sep. 24, 2003, pp. 1-3.

Strunk et al., "The Element of Style", Third Edition, 1979, MacMillian Publ. Co., Inc., New York, NY, all pages.

Burton, "Elementary Number Theory", Fourth Edition, 1998, The McGraw-Hill Companies, Inc., all pages.

Defler, "How Networks Work", Bestseller Edition, 1996, Ziff-Davis Press, Emeryville, CA all pages.

White, "How Computers Work", Millennium Edition, 1999, Que Corporatin, Indianapolis, IN, all pages.

Gralla, "How the Internet Works", Millennium Edition, 1999, Que Corporation, Indianapolis, IN, all pages.

Muller, "Desktop Encyclopedia of the Internet", 1999, Artech House Inc., Norwood, MA, all pages.

* cited by examiner

FIG. 8A

GRAPHICAL USER INTERFACE WITH IMPROVED MEDIA PRESENTATION

CROSS-REFERENCE TO RELATED APPLICATIONS

This application claims priority to U.S. Provisional Patent Application No. 60/756,511, filed Jan. 4, 2006, and entitled "GRAPHICAL USER INTERFACE WITH IMPROVED MEDIA PRESENTATION," which is hereby incorporated herein by reference.

This application is related to: (i) U.S. patent application Ser. No. 10/833,267, filed Apr. 26, 2004, and entitled "METHOD AND SYSTEM FOR NETWORK-BASED PURCHASE AND DISTRIBUTION OF MEDIA," which is hereby incorporated herein by reference; and (ii) U.S. patent application Ser. No. 10/832,984, filed Apr. 26, 2004, and entitled "GRAPHICAL USER INTERFACE FOR BROWSING, SEARCHING AND PRESENTING MEDIA ITEMS," which is hereby incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure as it appears in the U.S. Patent and Trademark Office patent file or records, but otherwise reserves all copyright rights whatsoever.

BACKGROUND OF THE INVENTION

1. Field of the Invention

The present invention relates to media presentation and, more particularly, to media presentation in a client-server environment.

2. Description of the Related Art

Today, media management applications are available for use on personal computers to assist users with managing and playing their electronic media. One popular media management application is iTunes® media program available from Apple Computer, Inc. Through a graphical user interface, the iTunes® media program enables a user to not only display a track listing of locally stored songs but also browse or purchase media information or items from a remote music store. However, users cannot view media information or items from the music store while also viewing a track listing of locally stored songs.

FIG. 1A is a screen shot of a conventional media display window 100. The media display window 100 includes a source region 102 and a track list region 104. The source region 102 indicates a plurality of different sources that can be selected. As shown in FIG. 1A, the "Library" source is currently selected. The track list region 104 lists a plurality of tracks that are available from the "Library" source (i.e., local storage). In this case, the audio tracks are displayed in a row and column format. For example, each row can pertain to a different song, and each column can provide name, time, artist and album for the corresponding song. In addition, the media display window 100 includes playback controls 106 (including play, rewind and fast forward), a search box 108, and a browse control 110.

FIG. 1B is a screen shot of another conventional media display window 150. The media display window 150 includes a source region 152 and an online browse window 154. The source region 152 includes a plurality of sources that can be selected. As shown in FIG. 1B, the "Music Store" source has been selected. In such case, the browse window 154 displays music information or items that are available from a remote music store. The browse window 154 presents media items and other descriptive information for media content available from the music store. In particular, the browse window 154 includes navigation links in an "Inside the Music Store" section 156 and account information in an "Account" section 158. The browse window 154 also includes a "New Releases" section 160 and various promotional images for certain media items in regions 162 and 164. The browse window 154 also includes a "Todays Top Songs" section 166 and a "Todays Top Albums" section 168.

A media management application, such as the iTunes® media program, is able to present the media display screens 100 and 150 as illustrated in FIGS. 1A and 1B, depending upon the particular media source selected. However, often, many users use the media management application only with regard to their own local (or personal) content, such as the "Library" source. As a result, such users do not get the benefits of interacting with the "Music Store" source. For example, the "Music Store" can provide not only media content for preview and purchase but also informational content to the user related to new releases, top songs, promotions, etc. However, since many users do not utilize the "Music Store", they do not recognize the benefits or extent of the content available from the "Music Store."

Thus, there is a need for improved graphical user interfaces that facilitate user interaction with not only local media content but also remote media content.

SUMMARY OF THE INVENTION

The invention relates to improved graphical user interfaces and techniques for providing remote media content to users. According to one aspect of the invention, an application window display on a display device can expose a user not only to local media content but also to remote media content that is associated with the local media content. The local media content is stored locally, while the remote media content is stored remotely and available from a remote media server. According to another aspect of the invention, the remote media content to be displayed can be determined in a manner that is dependent on a user interaction with the local media content. According to still another aspect of the invention, the manner by which the remote media content is displayed can be dependent on the availability of remote media content at the remote media server.

The invention can be implemented in numerous ways, including as a method, system, device, apparatus, or computer readable medium. Several embodiments of the invention are discussed below.

As a method for displaying local media information and remote media information on a display screen associated with a computing device, one embodiment of the invention includes at least the acts of: obtaining local media information pertaining to local media items stored on a local media source; displaying the local media information on a first part of the display screen; determining an appropriate remote media presentation format; acquiring remote media information pertaining to remote media items stored on a remote media source; and displaying the remote media information on a second part of the display screen, wherein the remote media information and the local media information are concurrently displayed on the display screen.

As a method for displaying local media information and remote media information on a display screen associated with a computing device, another embodiment of the invention includes at least the acts of: obtaining local media information pertaining to local media items stored on a local media source; displaying the local media information on a first part of the display screen; receiving a user selection of one of the local media items by interacting with the local media information being displayed on the first part of the display screen; distinguishably displaying at least a portion of the local media information corresponding to the one of the local media items selected by the user selection; determining an appropriate remote media presentation format based on the user selection; acquiring remote media information pertaining to remote media items stored on a remote media source; and displaying the remote media information on a second part of the display screen in accordance with the appropriate remote media presentation format.

As a computing system capable of displaying media information, one embodiment of the invention includes at least a data storage device that stores media content, a display device, and a processor for storing, accessing and presenting the stored content from the data storage device. The processor is configured to: (i) obtain local media information pertaining to local media items stored on a local media source; (ii) display the local media information on a first part of the display screen; (iii) determine an appropriate remote media presentation format; (iv) acquire remote media information pertaining to remote media items stored on a remote media source; and (v) display the remote media information on a second part of the display screen, wherein the remote media information and the local media information are concurrently displayed on the display screen.

As a computer readable medium including at least computer program code for displaying local media information and remote media information on a display screen associated with a computing device, one embodiment of the invention includes at least: computer program code for obtaining local media information pertaining to local media items stored on a local media source; computer program code for displaying the local media information on a first part of the display screen; computer program code for receiving a user selection of one of the local media items by interacting with the local media information being displayed on the first part of the display screen; computer program code for distinguishably displaying at least a portion of the local media information corresponding to the one of the local media items selected by the user selection; computer program code for determining an appropriate remote media presentation format based on the user selection; computer program code for acquiring remote media information pertaining to remote media items stored on a remote media source; and computer program code for displaying the remote media information on a second part of the display screen in accordance with the appropriate remote media presentation format.

As a system for displaying media information on a display screen associated with a computing device, one embodiment of the invention includes at least: means for obtaining local media information pertaining to local media items stored on a local media source; means for displaying the local media information on a first part of the display screen; means for receiving a user selection of one of the local media items by interacting with the local media information being displayed on the first part of the display screen; means for distinguishably displaying at least a portion of the local media information corresponding to the one of the local media items selected by the user selection; means for determining an appropriate remote media presentation format based on the user selection; means for acquiring remote media information pertaining to remote media items stored on a remote media source; and means for displaying the remote media information on a second part of the display screen in accordance with the appropriate remote media presentation format.

Other aspects and advantages of the invention will become apparent from the following detailed description taken in conjunction with the accompanying drawings which illustrate, by way of example, the principles of the invention.

BRIEF DESCRIPTION OF THE DRAWINGS

The invention will be readily understood by the following detailed description in conjunction with the accompanying drawings, wherein like reference numerals designate like structural elements, and in which:

FIG. 8A is a screen shot of a media presentation window according to one embodiment of the invention.

DETAILED DESCRIPTION OF THE INVENTION

The invention relates to improved graphical user interfaces and techniques for providing remote media content to users. According to one aspect of the invention, an application window display on a display device can expose a user not only to local media content but also to remote media content that is associated with the local media content. The local media content is stored locally, while the remote media content is stored remotely and available from a remote media server. According to another aspect of the invention, the remote media content to be displayed can be determined in a manner that is dependent on a user interaction with the local media content. According to still a further aspect of the invention, the manner by which the remote media content is displayed can be dependent on the availability of remote media content at the remote media server.

A graphical user interface according to one embodiment of the invention can be presented to a user at a client (client machine). In one embodiment, the graphical user interface is presented to the user by an application program that runs on the client. The graphical user interface is particularly useful for an application program that provides management, playback and purchase of media in a client-server environment. The media can, for example, be audio, video, or image data.

Embodiments of the invention are discussed below with reference to FIGS. 2-9. However, those skilled in the art will readily appreciate that the detailed description given herein with respect to these figures is for explanatory purposes as the invention extends beyond these limited embodiments.

Figure 1A:
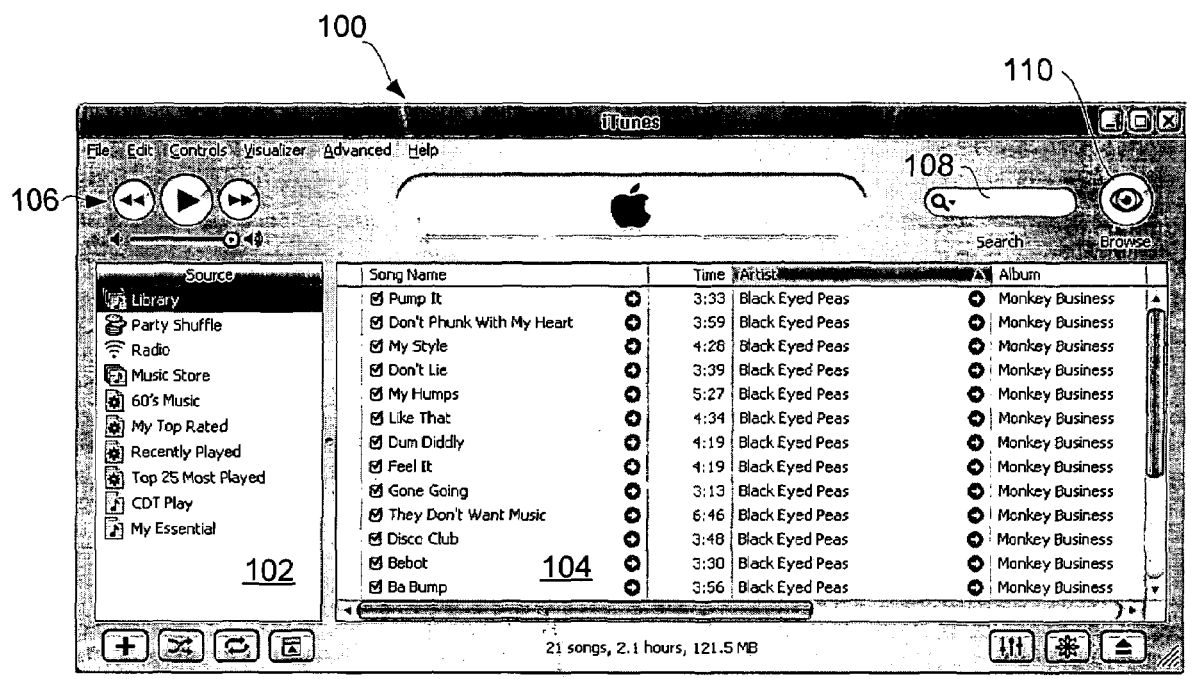
FIG. 1A is a screen shot of a conventional media display window.
Figure 1B:
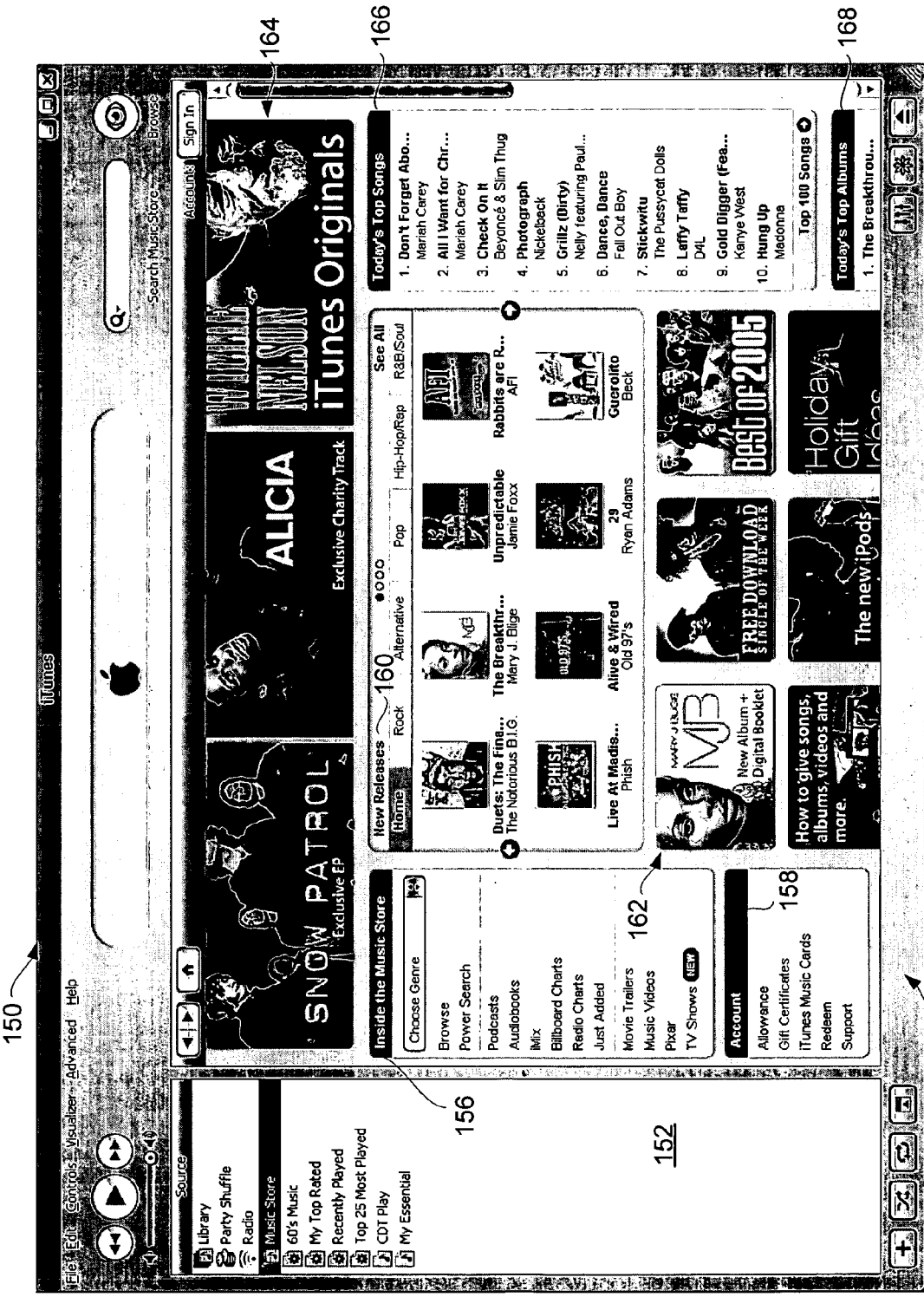
FIG. 1B is a screen shot of another conventional media display window.
Figure 2:
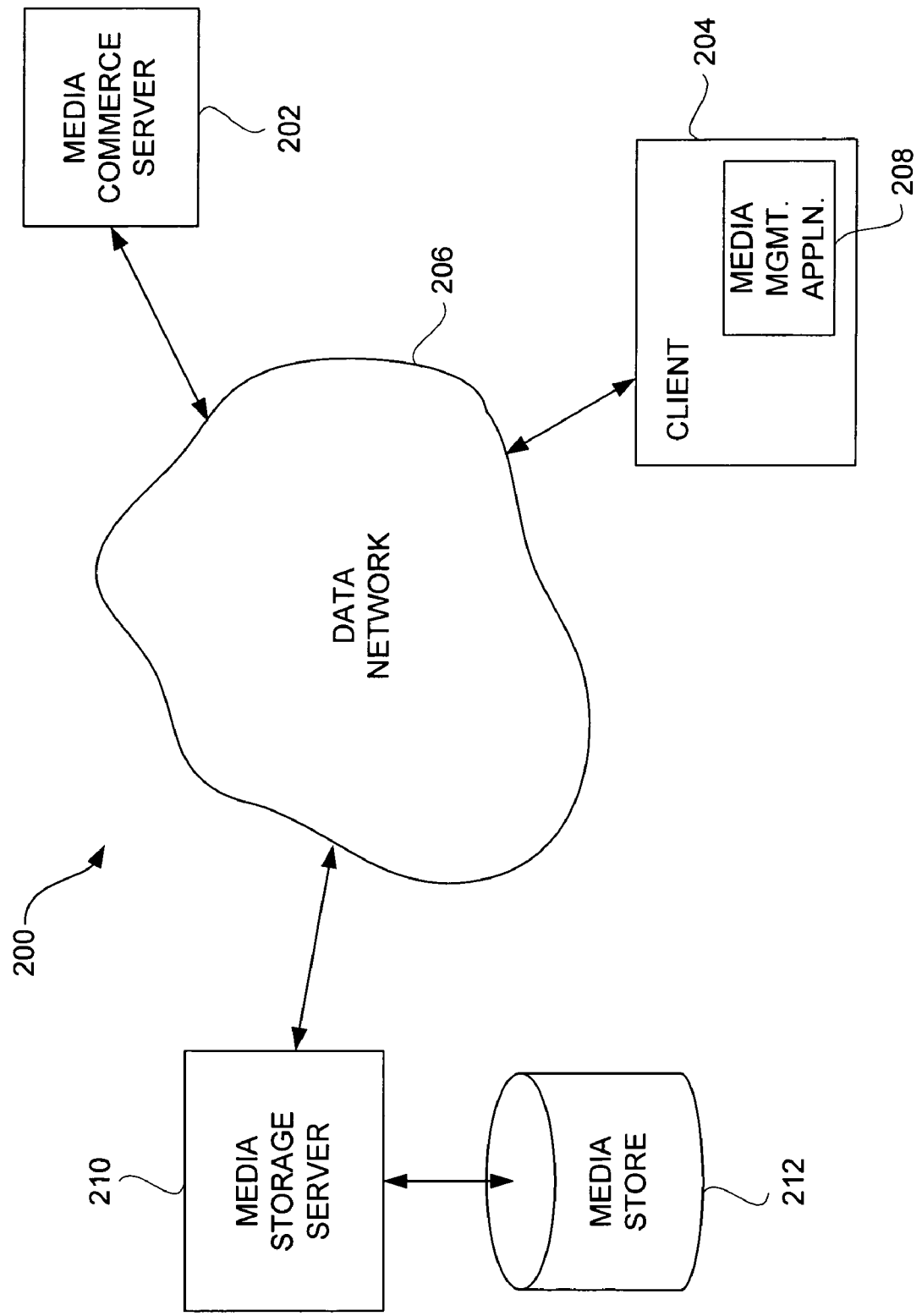
FIG. 2 is a block diagram of a media presentation system according to one embodiment of the invention.

FIG. 2 is a block diagram of a media presentation system 200 according to one embodiment of the invention. The media presentation system 200 includes a remote media server 202. The remote media server 202 coordinates review and/or purchase of media items through on-line interaction. The media presentation system 200 also includes a client 204. Typically, the media presentation system 200 would include a plurality of different clients 204. Each client 204 includes a media management application 208. The media management application 208 is an application program (e.g., software application) that operates on the client 204, which is a computing device. The client 204 is coupled to the remote media server 202 through a data network 206. Hence, any of the clients 204 can interact with the remote media server 202 to review and/or purchase media items. In one embodiment, the data network 206 includes at least a portion of the Internet. The clients 204 can vary with application but generally are computing devices that have memory storage. Often, the clients 204 are personal computers or other computing devices (including portable computing devices such as portable computers and portable media players) that are capable of storing and presenting media to their users.

The media presentation system 200 also includes a media storage server 210 and a media storage device 212. The media storage server 210 represents a remote storage server that couples to the data network 206. The media storage device 212 provides mass storage of the numerous media items that are available for review or purchase via the media presentation system 200. Once purchased, the media items can be accessed from the media storage device 212 over the data network 206 by way of the media storage server 210.

More particularly, the media presentation system 200 allows a user of the client 204 to utilize the media management application 208 to browse, search or sort through a plurality of media items that can be purchased from the remote media server 202. The media management application 208 may also allow the user to preview a media clip of the media items. Still further, the media management application 208 may permit the media items to be streamed to the client 204. In the event that the user of the media management application 208 desires to purchase a particular media item, the user (via the media management application 208) and the remote media server 202 engage in an on-line commerce transaction in which the user pays for access rights to the particular media item. In one embodiment, a credit card associated with the user is credited for the purchase amount of the particular media item.

In the media presentation system 200 shown in FIG. 2, the media items are stored in the media store 212 and retrieved via the media storage server 210. Hence, the remote media server 202 need not burden its resources to deliver any of the media items that may be purchased to the client 204. Instead, on purchasing a particular media item, the remote media server 202 sends download information to the media management application 208 on the client 204. The download information can then be used by the media management application 208 (and the client 204) to retrieve the media content for the particular media item by interacting with the media storage server 210 through the data network 206. In this regard, the media storage server 210 obtains the media content corresponding to the particular media item from the media store 212 and downloads such content through the data network 206 to the client 204. The downloaded media content can then be stored on the client 204.

The connections through the data network 206 between the remote media server 202, the client 204 and the media storage server 210 can be through secure connections, such as Secure Sockets Layer (SSL). Further, the media content can be stored at the client 204 in an encrypted manner.

As discussed in greater detail below, the media management application 208 can utilize an improved graphical user interface. More particularly, in one embodiment, a window presented on a display device of the client 204, when executing the media management application 208, includes (i) an upper portion that displays local media information from the client 204 and (ii) a lower portion that displays remote media information. The local media information pertains to media items stored locally at the client 204. The media items stored locally can also be referred to as a local collection of media, such as a user's local collection of media. The remote media information pertains to media information stored remotely at the remote media server 202, the media storage server 210 or the media store 212. In one embodiment, the remote media information can pertain to media items that are available remotely, or other information about media items.

Additionally, the media presentation system 200 can also include or couple to other remote data sources (e.g., remote servers). In such an embodiment, other remote data acquired from the remote data sources can be provided in the window presented on the display device of the client 204, such as in the lower portion along with or in place of the remote media information. This other remote data can, for example, be related to or complementary to the remote media information and/or the local media information. As a specific example, the other remote data can be information on concerts, music stations, etc. in the area that are related to or complementary to the remote media information and/or the local media information. As another specific example, the other remote data can be e-commerce offers for products or services that are related to or complementary to the remote media information and/or the local media information.

Figure 3:
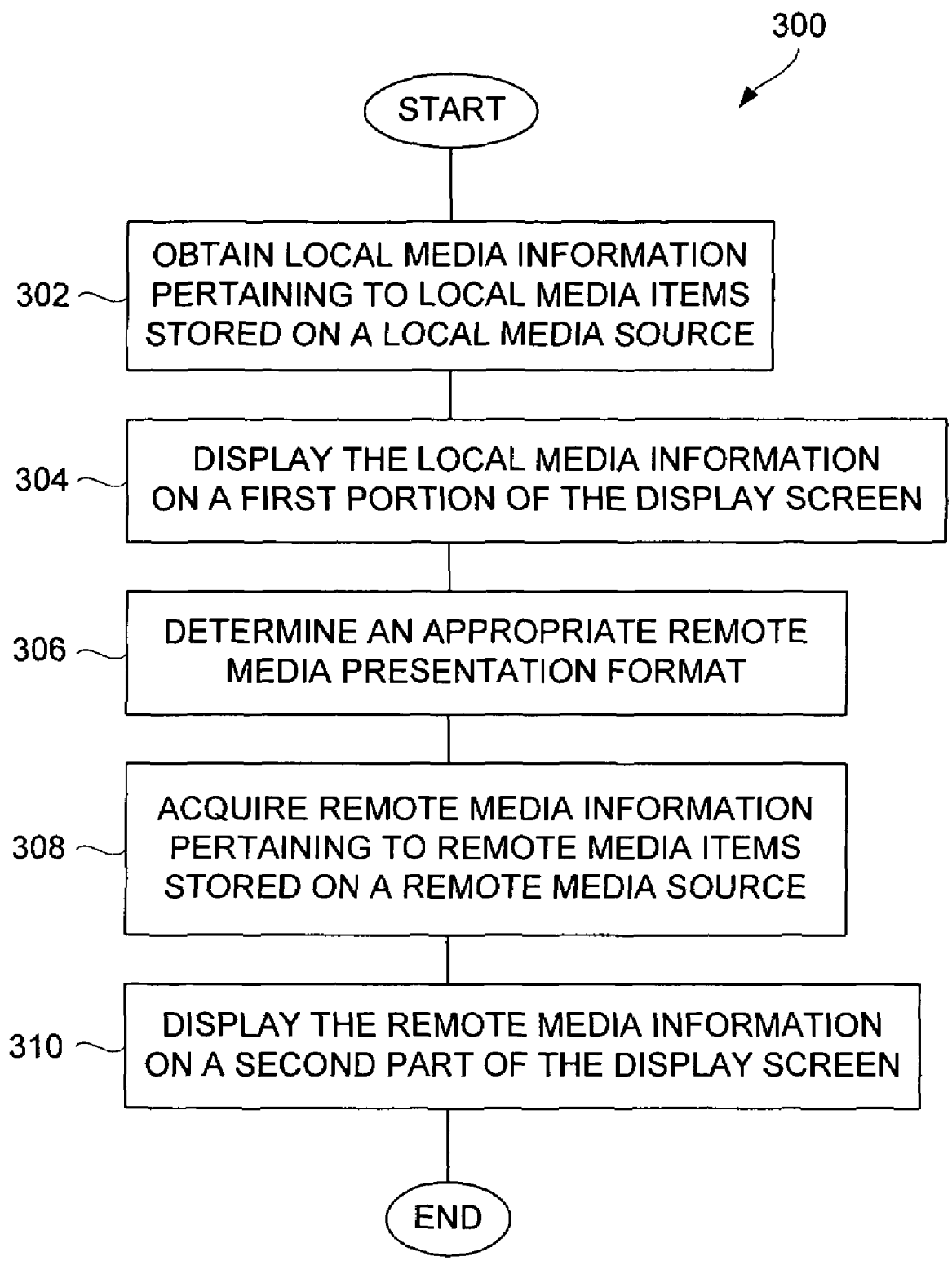
FIG. 3 is a flow diagram of a media presentation process according to one embodiment of the invention.

FIG. 3 is a flow diagram of a media presentation process 300 according to one embodiment of the invention. The media presentation process 300 is, for example, performed by a media management application, such as the media management application 208 illustrated in FIG. 2.

The media presentation process 300 initially obtains 302 local media information pertaining to local media items stored on a local media source. For example, the media management application can operate on a client machine, such as a personal computer, and the local media source can be a storage device of the client. The local media information can pertain to media attributes of the local media items. For example, the media attributes can pertain to name, time, artist, album and genre.

The local media information is then displayed 304 on a first portion of a display screen. The display screen can correspond to a full screen or a window presented on a display device associated with the client machine. The first portion of the display screen is then a sub-part of the full screen or window. Next, an appropriate remote media presentation format is determined 306. Here, according to one embodiment of the invention, remote media can be dynamically presented in a variety of different formats. Hence, the media presentation process 300 operates to determine 306 the appropriate remote media presentation format. Once the appropriate remote media presentation format has been determined 306, remote media information pertaining to remote media items stored on a remote media source are acquired 308. In one embodiment, the remote media information being acquired 308 is dependent upon the particular remote media presentation format being determined 306. In any case, after the remote media information has been acquired 308, the remote media information is displayed 310 on a second part of the display screen. Following the block 310, the media presentation process 300 is complete and ends.

Figure 4A:
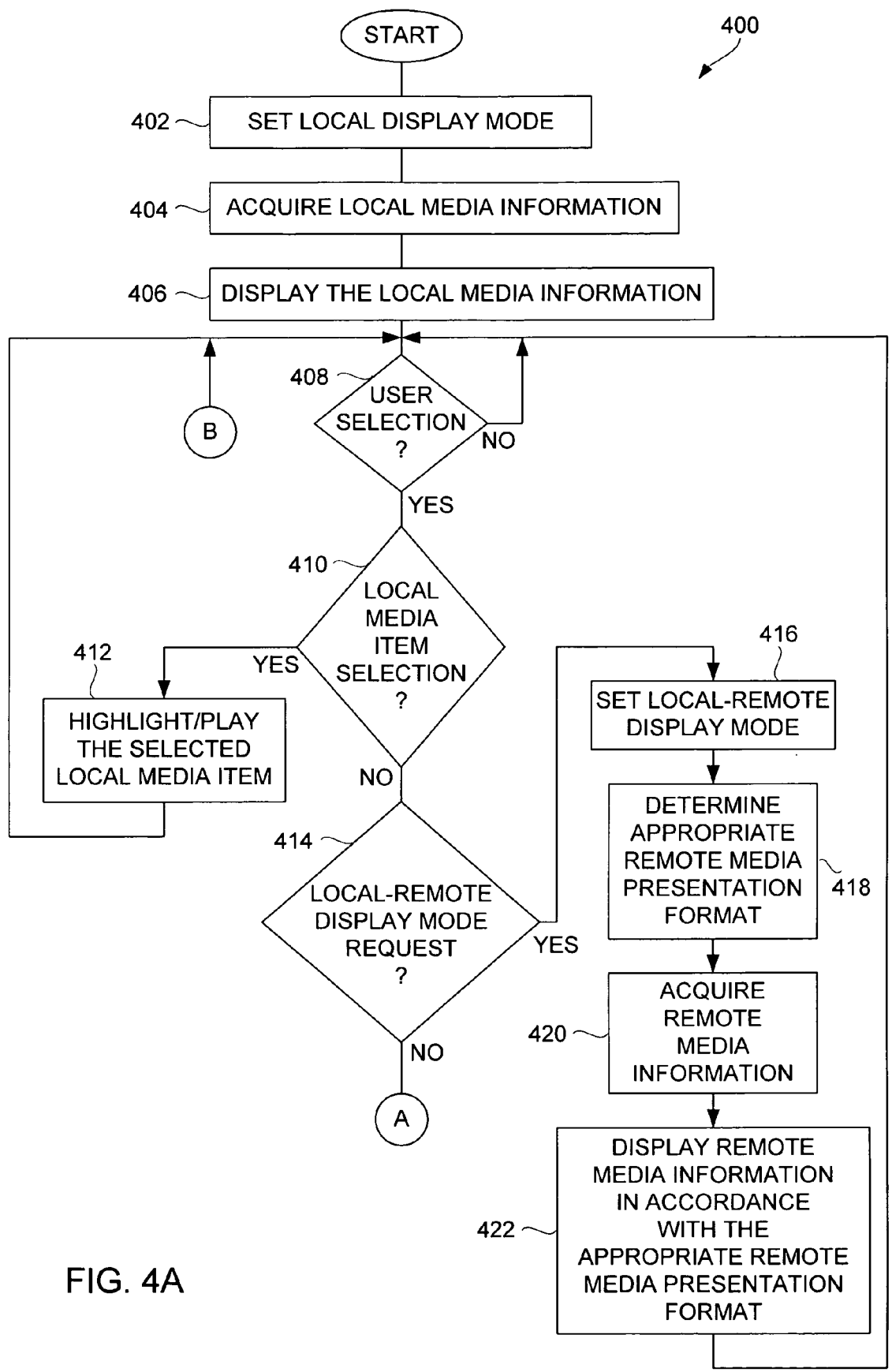
FIGS. 4A and 4B are flow diagrams of a media presentation process according to another embodiment of the invention.
Figure 4B:
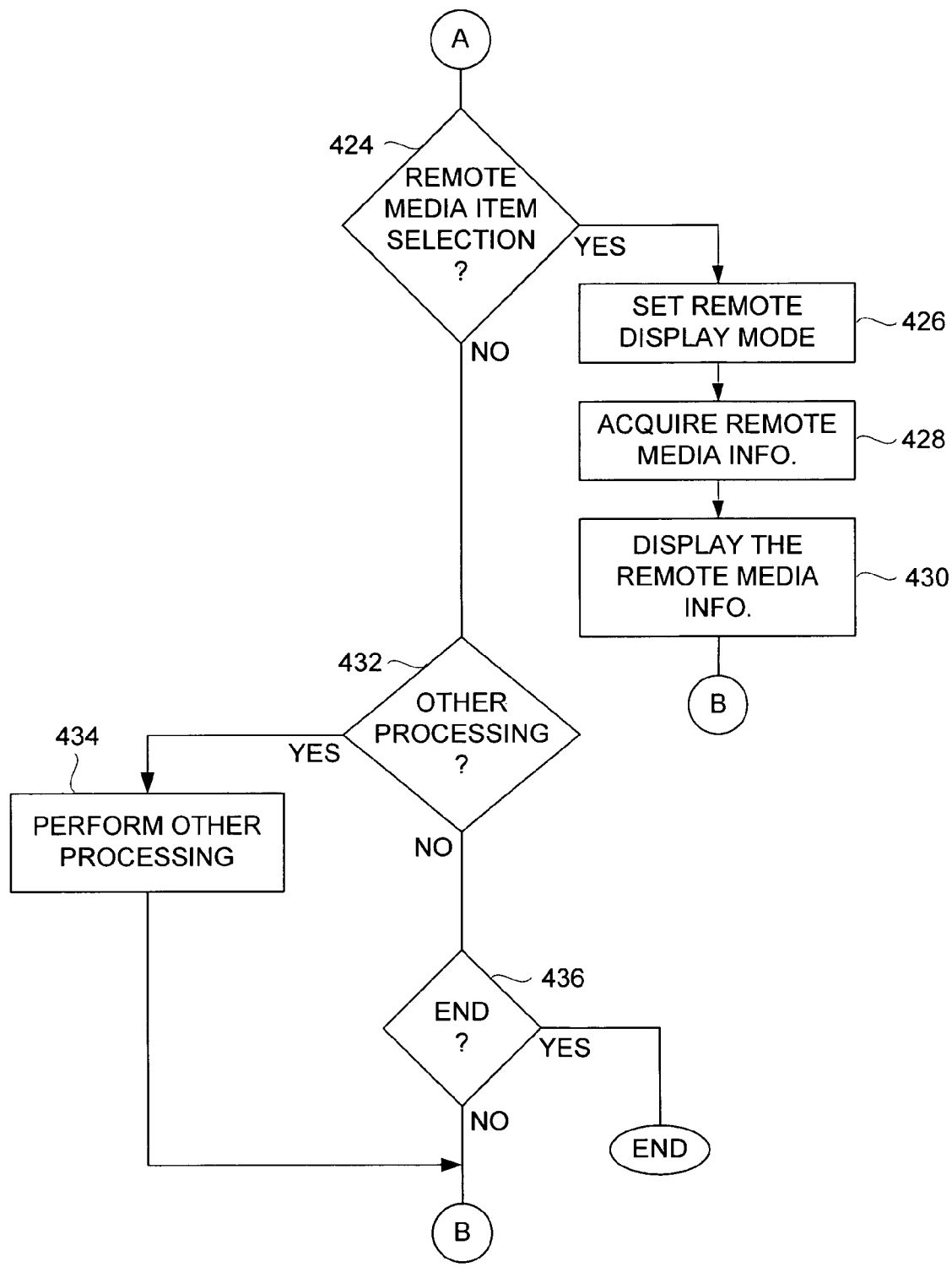

FIGS. 4A and 4B are flow diagrams of a media presentation process 400 according to another embodiment of the invention. The media presentation process 400 can be considered a more detailed implementation of the media presentation process 300 illustrated in FIG. 3. The media presentation process 400 is, for example, performed by a media management application operating on a computing device, such as the client 204 illustrated in FIG. 2.

The media presentation process 400 initially sets 402 a local display mode. Then, local media information is acquired 404. The local media information is then displayed 406. The local display mode is a display mode in which the window or display screen is at least substantially consumed by local media information. The local media information would be displayed 406 on a display device associated with the computing device. The computing device would typically also support a user input device that allows the user to interact with the computing device, such as with a mouse, trackball, keyboard, touch screen, remote controller, etc.

The media presentation process 400 also includes a decision 408 that determines whether a user selection has been made. When the decision 408 determines that a user selection has not been made, then the media presentation process 400 can await a user selection. Once the decision 408 determines that a user selection has been made, a decision 410 determines whether a local media item has been selected. Here, the decision 410 determines whether the user selection is a selection of a local media item that is being displayed. When the decision 410 determines that a local media item has been selected, then the selected local media item is highlighted or played 412. The user selection can be a designation of an item, in which case the item can be highlighted, or can be a request to play the selected local media item, in which case the computing device can play the selected local media item. Following the block 412, the media presentation process 400 can return to repeat the decision 408 so that additional user selections can be similarly processed. In the event that there are no user selections for an extended period of time, the media presentation process 400 can reset the media presentation process 400 or can permit other processing, although not shown in FIG. 4A.

Alternatively, when the decision 410 determines that a local media item selection has not been made, then a decision 414 determines whether a local-remote display mode has been requested. The local-remote display mode is a mode in which the display device concurrently displays local media information as well as remote media information. Hence, when the decision 414 determines that a local-remote display mode has been requested, the local-remote display mode is set 416. Then, an appropriate remote media presentation format is determined 418. Here, the media presentation process 400 enables the remote media to be presented in a plurality of different media presentation formats. Hence, the block 418 operates to determine the appropriate one of the available remote media presentation formats. Next, remote media information is acquired 420. In one embodiment, the remote media information being acquired 420 is dependent upon the particular remote media presentation format that has been determined 418. After the remote media information has been acquired 420, the remote media information is displayed 422 in accordance with the appropriate remote media presentation format. Following the block 422, the media presentation process 400 returns to repeat the decision 408 and subsequent operations so that additional user selections can be similarly processed.

On the other hand, when the decision 414 determines that a local-remote display mode has not been requested, a decision 424 determines whether the user selection is a remote media item selection. When the decision 424 determines that the user selection is a remote media item selection, a remote display mode is set 426. The remote display mode is a display mode in which the window or display screen is at least substantially consumed by remote media information. After the remote display mode has been set 426, remote media information is acquired 428. The remote media information is acquired from a remote media server. For example, the remote media server can be the media storage server 210 (or its media store 212) or the media commerce server 202 illustrated in FIG. 2. After the remote media information has been acquired 428, the remote media information is displayed 430. Following the block 430, the media presentation process 400 returns to repeat the decision 408 and subsequent blocks so that additional user requests can be similarly processed.

Alternatively, when the decision 424 determines that the user selection is not a remote media item selection, then a decision 432 determines whether the user selection is associated with other processing. When the decision 432 determines that the user selection is associated with other processing, the other processing can be performed 434. On the other hand, when the decision 432 determines that the user selection is not associated with other processing, then a decision 436 determines whether the media presentation process 400 should end. When the decision 436 determines that the media presentation process 400 should not end, then the media presentation process 400 returns to repeat the decision 408. Likewise, following the block 434, the media presentation process 400 returns to repeat the decision 408. Alternatively, when the decision 436 determines that the media presentation process 400 should end, then the media presentation process 400 ends.

Figure 5:
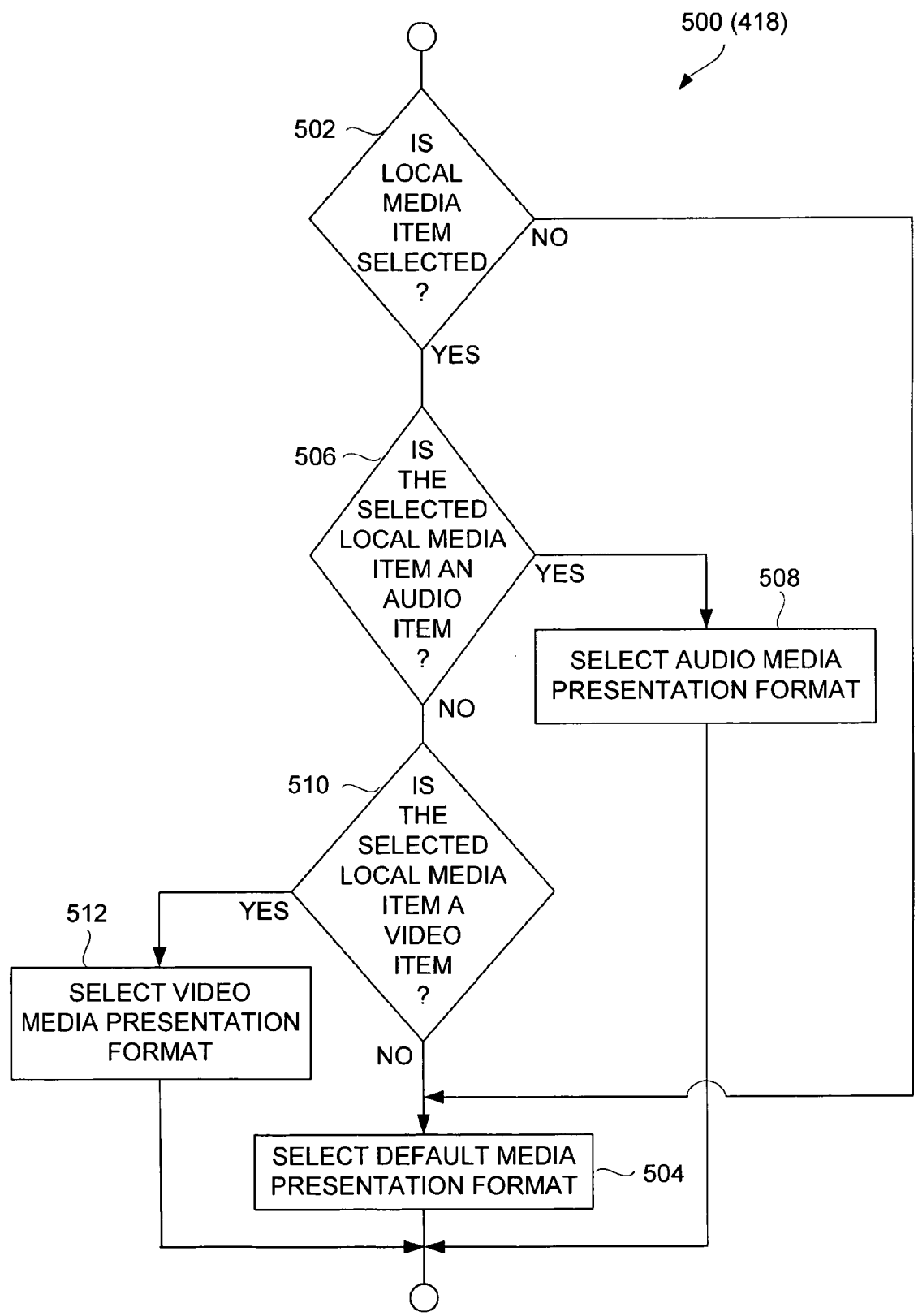
FIG. 5 is a flow diagram of a media presentation format determination process according to one embodiment of the invention.

FIG. 5 is a flow diagram of a media presentation format determination process 500 according to one embodiment of the invention. The media presentation format determination process 500 is, for example, processing that can be performed by the block 418 of the media presentation process 400 illustrated in FIG. 4A. In this embodiment, the type of media is used in determining the appropriate media presentation format to be utilized. The different media presentation formats can serve to cause media information, namely, remote media information, to be displayed differently. More specifically, in one embodiment, the media presentation format operates to determine what media information will be presented (e.g., displayed) as well as where and how that media information will be presented.

The media presentation format determination process 500 begins with a decision 502 that determines whether a local media item has been selected. Here, as illustrated in FIG. 4A, the media presentation process 400 previously displayed local media information on a display device. The local media information pertains to or corresponds to local media items. Hence, the decision 502 determines whether a local media item has been selected. As one example, a local media item can be selected by a selection of the associated local media information being displayed. In any case, when the decision 502 determines that a local media item has not been selected, then a default media presentation format is selected 504.

On the other hand, when the decision 502 determines that a local media item has been selected, a decision 506 determines whether the selected local media item is an audio item. The local media items that can be selected typically include at least audio and video items, which are considered different types of media. When the decision 506 determines that the selected local media item is an audio item, then an audio media presentation format is selected 508.

Alternatively, when the decision 506 determines that the selected local media item is not an audio item, a decision 510 determines whether the selected local media item is a video item. When the decision 510 determines that the selected local media item is a video item, a video media presentation format is selected 512. On the other hand, when the decision 510 determines that the selected local media item is not a video item, then the default media presentation format can be selected 504. Following the blocks 504, 508 and 512, the media presentation format determination process 500 ends.

Although the type of media used with the media presentation format determination process 500 are audio and video, it should be understood that other types could be similarly used, and that more specific types could also be used. Examples of possible more specific types include songs, audiobooks, movies, music videos, podcasts, etc.

Figure 6:
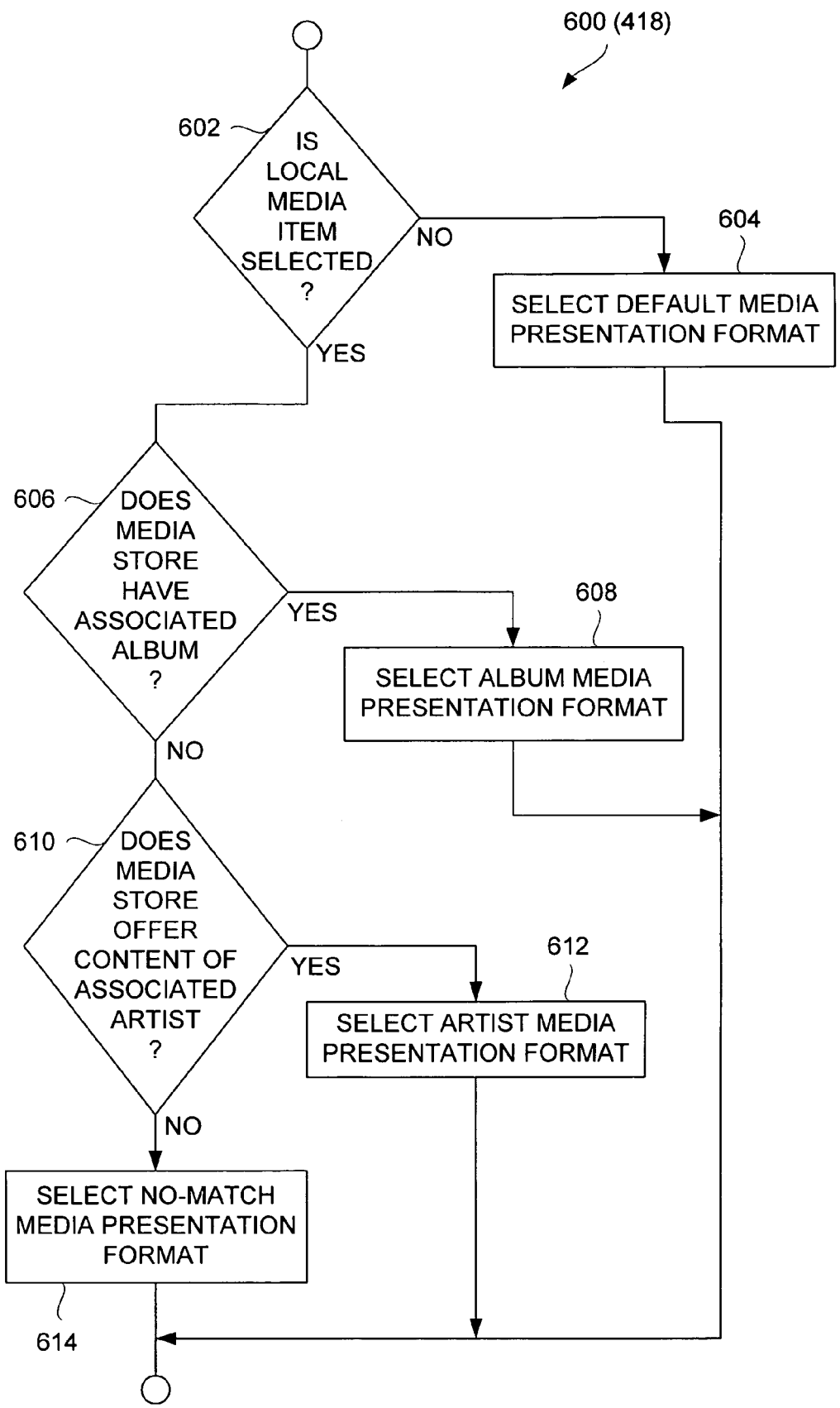
FIG. 6 is a flow diagram of a media presentation format determination process according to another embodiment of the invention.

FIG. 6 is a flow diagram of a media presentation format determination process 600 according to another embodiment of the invention. The media presentation format determination process 600 is, for example, suitable for use as the processing associated with the block 418 illustrated in FIG. 4A. In this embodiment, media availability is used in determining the appropriate media presentation format to be utilized. The different media presentation formats can serve to cause media information to be displayed differently. More specifically, in one embodiment, the media presentation format operates to determine what media information will be presented (e.g., displayed) as well as where and how that media information will be presented.

In this embodiment of the media presentation format determination process 600, the local media item is most suitably an audio item, such as a song. As such, the song would have an associated artist and an associated album. However, similar processing can be performed for other non-song media items, such as videos, podcasts, audiobooks.

The media presentation format determination process 600 begins with a decision 602. The decision 602 determines whether a local media item has been selected. Here, as illustrated in FIG. 4A, the media presentation process 400 previously displayed local media information on a display device. The local media information pertains to or corresponds to local media items. Hence, the decision 602 determines whether a local media item has been selected. As one example, a local media item can be selected by a selection of the associated local media information being displayed. In any case, when the decision 602 determines that a local media item has not been selected, then a default media presentation format is selected 604.

On the other hand, when the decision 602 determines that a local media item has been selected, then a decision 606 determines whether a media store (a type of remote media source) has an associated album. In other words, based on the local media item selected, the media store, which is remotely located, can be searched to determine whether the media store offers an associated album. Typically, the media store would offer the associated album for purchase, preview, streaming or other possible uses. When the decision 606 determines that the media store does offer an associated album, an album media presentation format is selected 608.

Alternatively, when the decision 606 determines that the media store does not have an associated album, a decision 610 determines whether the media store offers content of an associated artist. Here, the local media item selected has an associated artist. The media store is searched to determine whether it offers content from the associated artist. When the decision 610 determines that the media store does offer content of the associated artist, an artist media presentation format is selected 612. On the other hand, when the decision 610 determines that the media store does not offer content of the associated artist, then a no-match media presentation format is selected 614. Following the blocks 604, 608, 612 and 614, the media presentation format determination process 600 ends.

The media presentation format determination process 500 can be used separately or in combination with the media presentation format determination process 600. For example, when used together, the blocks 606-614 of FIG. 6 can be performed at block 508 of FIG. 5 to select one of a plurality of different audio media presentation formats. Similar processing could be performed at block 512 of FIG. 5 to select one of a plurality of different video media presentation formats.

Figure 7:
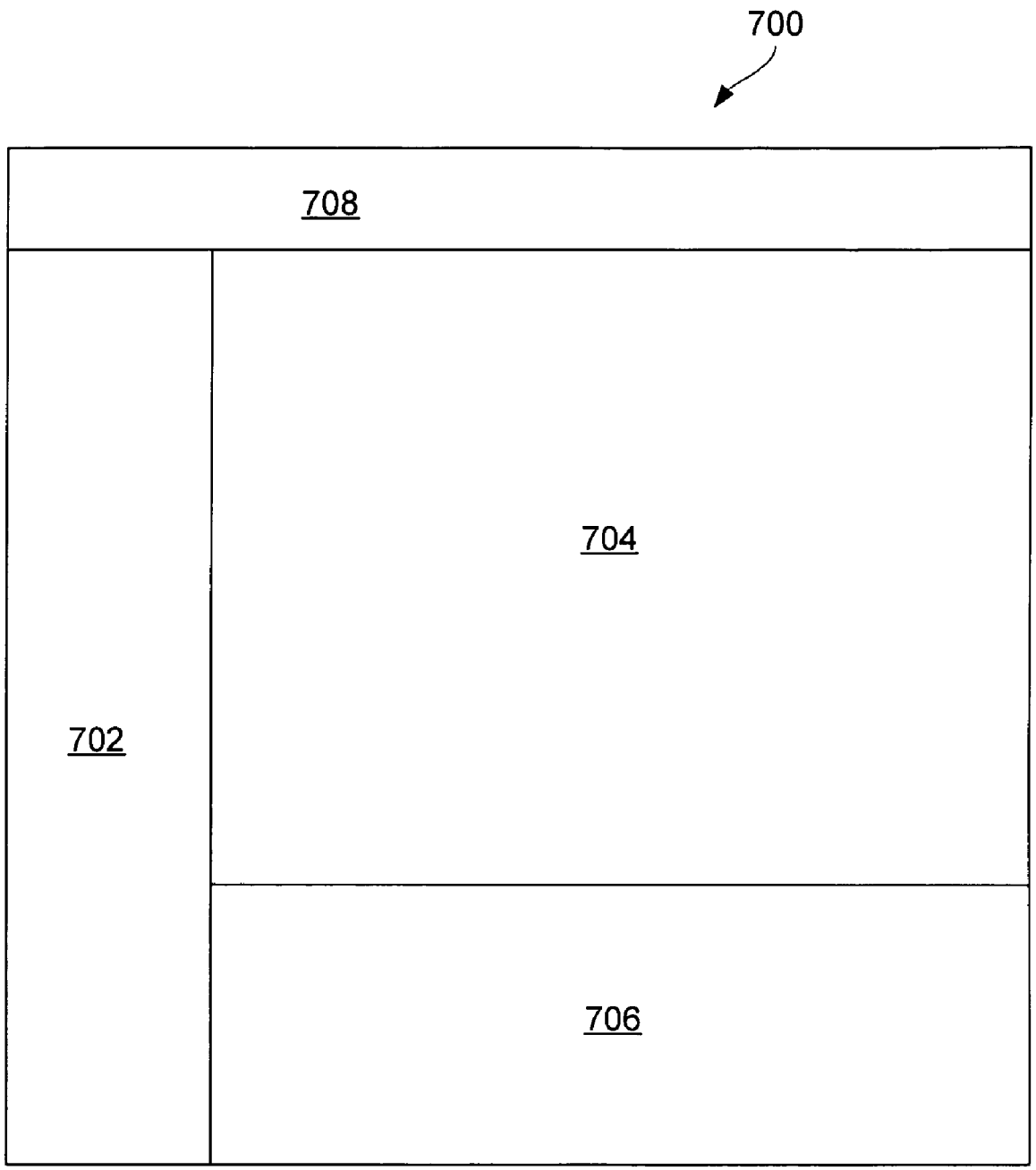
FIG. 7 is a diagram of a representative media presentation window according to one embodiment of the invention.

FIG. 7 is a diagram of a representative media presentation window 700 according to one embodiment of the invention. The media presentation window 700 is a graphical user interface (GUI) that includes a media source region 702, a media listing area 704, a remote media area 706, and a control and status area 708. The source region 702 can facilitate the selection of one of a plurality of different media sources. The media item listing area 704 provides a listing of media information pertaining to available media items from the selected media source. The remote media area 706 provides information on remotely available media items or other media information available from a remote media server. The media presentation format for the information displayed in the remote media area 706 can be a plurality of different formats. The particular format to be used can be dynamically determined. For example, the media presentation format determination process 500 or the media presentation format determination process 600 can be used to dynamically determine the format to be used. In one embodiment, the media information being presented in the remote media area 706 is dependent upon a selection of one of the available media items listed in the media item listing area 704. The media presentation window 700 can also include an information and status area 708. The information and status area 708 can provide user playback controls, search boxes, browse controls, toolbars, status information, volume control, etc.

Figure 8A:
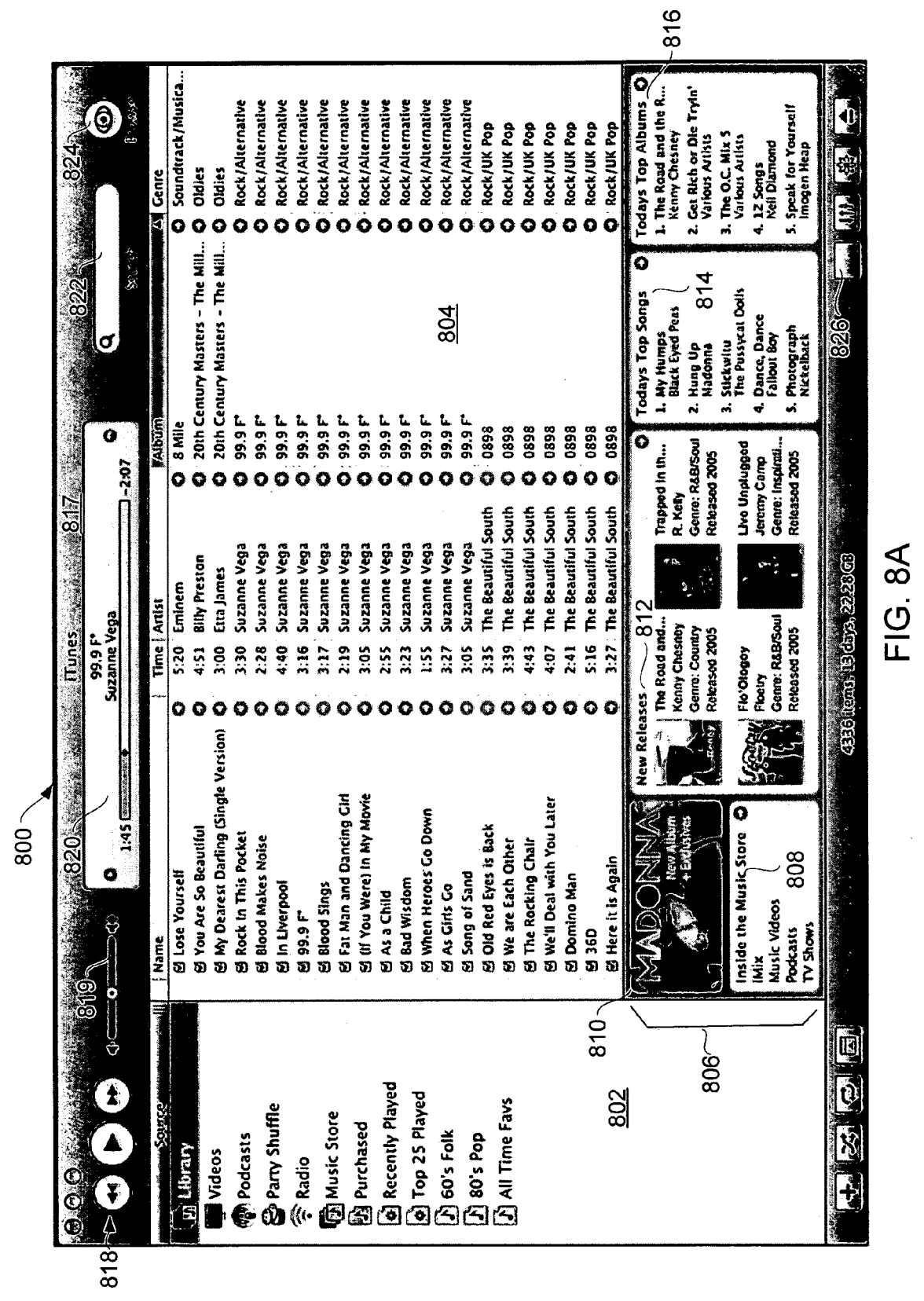

FIG. 8A is a screen shot of a media presentation window 800 according to one embodiment of the invention. The media presentation window 800 includes a media source region 802, a media listing area 804, and a remote media area 806. The remote media area 806 displays media items or media information in accordance with a media presentation format. As noted above, the media presentation format being utilized can be dynamically determined. In this embodiment, the media presentation format can be referred to as a default media presentation format. The default media presentation format, as illustrated in FIG. 8A, includes a promotional image section 808, an "Inside the Music Store" section 810, a "New Releases" section 812, a "Todays Top Songs" section 814, and a "Todays Top Albums" section 816. In this embodiment, the various sections 808-816 are presented as shown in FIG. 8A. The media presentation format, in this embodiment, controls the size of the various sections 808-816 and also the media items or media information being presented in each of such sections. The media presentation window 800 can also include an information and status area 817 at an upper portion of the media presentation window 800. The information and status area 817, as an example, can include user playback controls 818, a volume control 819, playback status information 820, a search box 822, and a browse control 824. Still further, the media presentation window 800 can include a control button or icon 826. The control button or icon 826 can operate to open or close, in a toggle-like manner, the remote media area 806. As shown in FIG. 8A, the remote media area 806 is open. Upon user selection of the button or control 826, the remote media area 806 would close (i.e., be removed from being displayed) and the media item listing area 804 would enlarge.

Figure 8B:
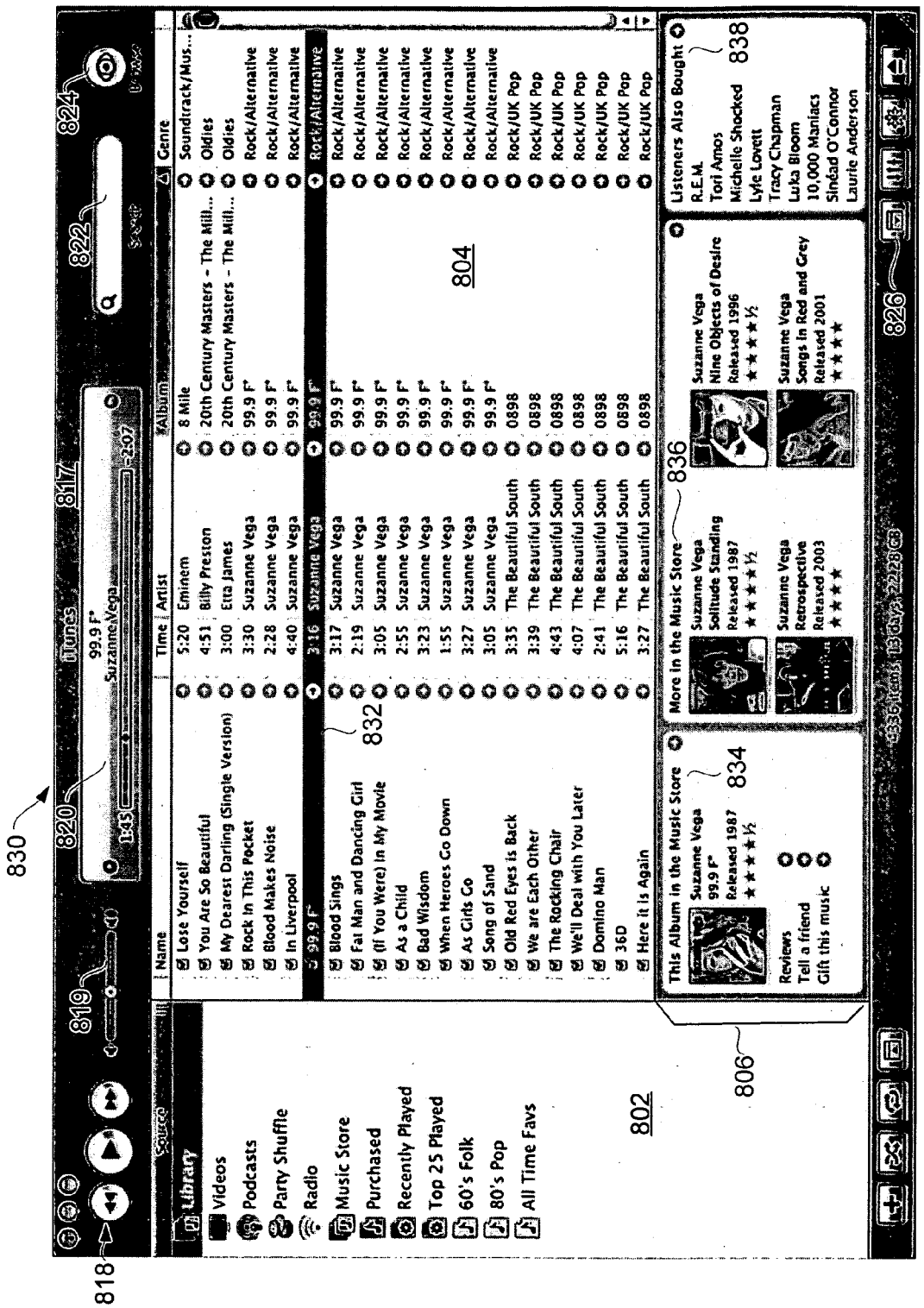
FIG. 8B is a screen shot of a media presentation window according to another embodiment of the invention.

FIG. 8B is a screen shot of a media presentation window 830 according to another embodiment of the invention. The media presentation window 830 is generally similar to the media presentation window 800 illustrated in FIG. 8A; however, the media presentation format being utilized in the remote media area 806 is different. More particularly, a particular track 832 has been selected from the media item listing area 804 which displays a track listing. In view of this selection, the media presentation format being utilized in the remote media area 806 can be dependent upon the selection of the particular track 832. In this particular example, it is assumed that the album "99.9 F.°" on which the particular track 832 resides is available from a remote media store. Hence, the media presentation format being utilized in the remote media area 806 is that presentation format that has been designated for use when the album on which the particular track 832 resides is available from the remote music store. The media presentation format in this situation includes a "This Album in the Music Store" section 834, a "More in the Music Store" section 836, and a "Listeners Also Bought" section 838. The "This Album in the Music Store" section 834 provides media information pertaining to the album ("99.9 F.°") on which the particular track 832 resides. The "More in the Music Store" section 836 provides media information concerning a plurality of other media items available from the music store, such as other albums from the same artist. The "Listeners Also Bought" section 838 provides a listing of other artists for which previous users of the music store have bought music from not only the other artists but also the artist of the particular track 832.

Figure 8C:
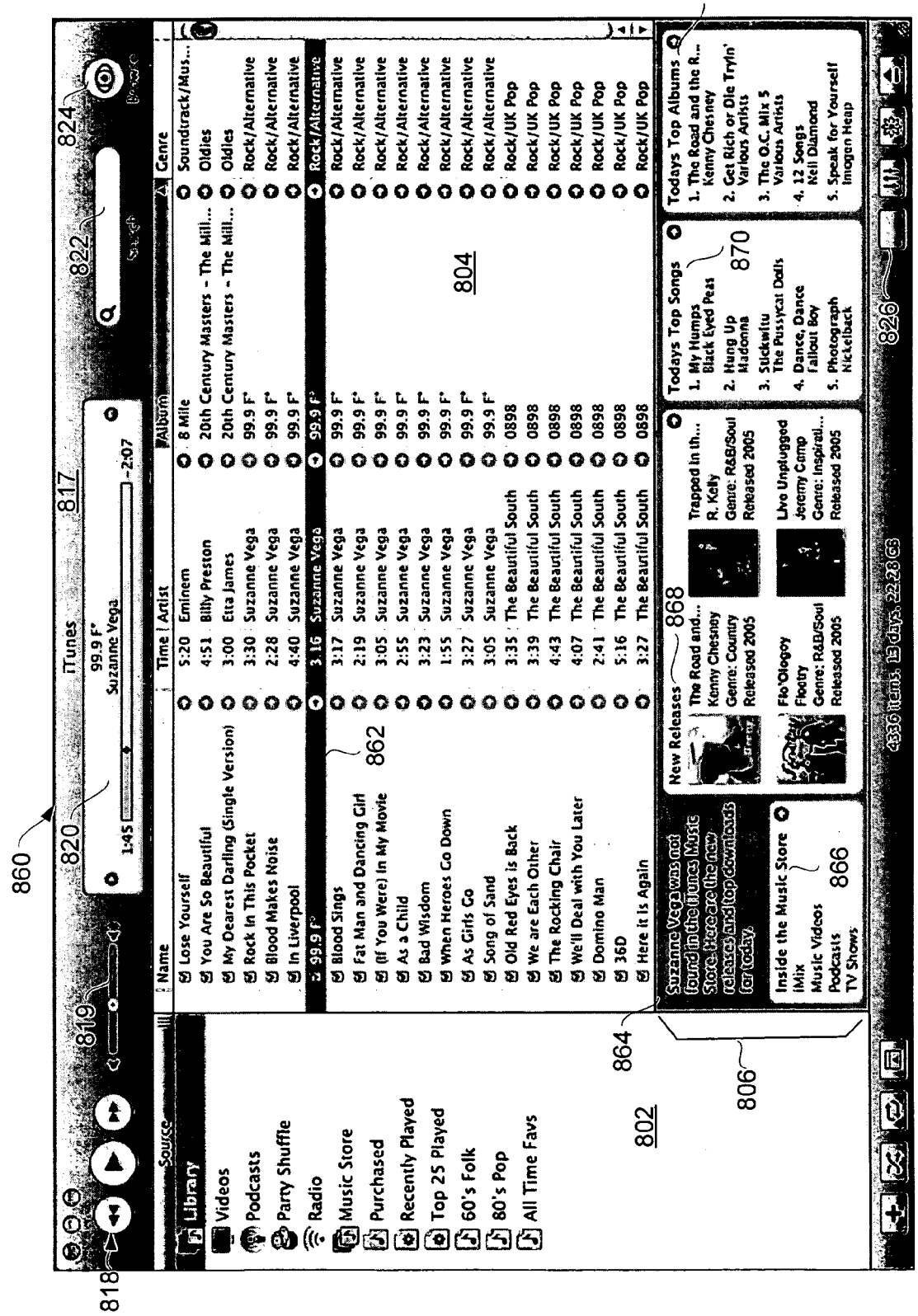
FIG. 8C is a screen shot of a media presentation window according to still another embodiment of the invention.

FIG. 8C is a screen shot of a media presentation window 860 according to still another embodiment of the invention. The media presentation window 860 is generally similar to the media presentation window 800 illustrated in FIG. 8A. Here, a user has made a user selection 862 of the particular track "99.9 F.°" by Suzanne Vega from the "99.9 F.°" album. In view of the user selection 862, the media presentation format being utilized in the remote media area 806 is dynamically determined. In this embodiment, the music store is searched to see if it offers media content associated with the artist or album corresponding to the user selection 862. In this example, it is assumed that the music store does not offer any media content from the artist or the album of the user selection 862. Hence, in the remote media area 806, the media presentation format being utilized corresponds to a situation in which there is no album or artist match with respect to the music store. The media presentation format includes an unavailable notification section 864 that informs a user that the artist was not found in the music store by either artist or album. In addition, the media presentation format includes additional sections 866-872 which can respectively correspond to the sections 810-816 of FIG. 8A.

Figure 9:
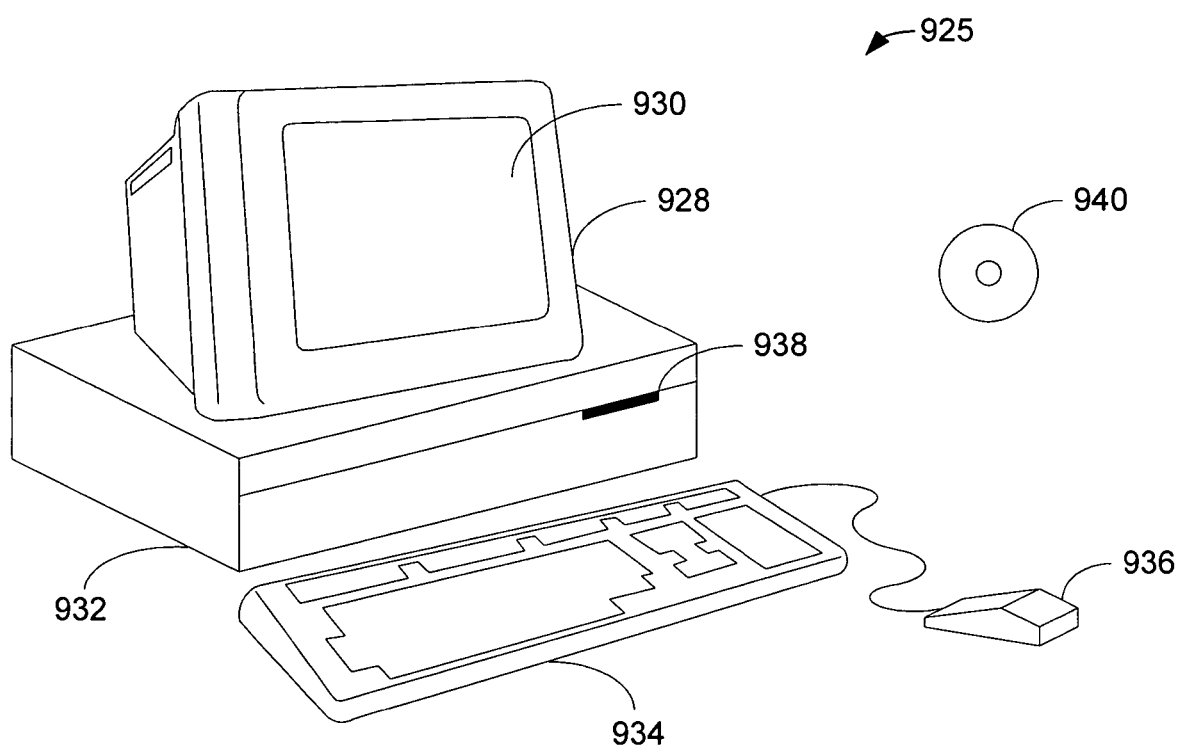
FIG. 9 shows an exemplary computer system suitable for use with the invention.

FIG. 9 shows an exemplary computer system 925 suitable for use with the invention. The computer system 925 includes a display monitor 928 having a single or multi-screen display 930 (or multiple displays), a cabinet 932, a keyboard 934, and a mouse 936. The cabinet 932 houses a drive 938, such as a CD-ROM 940, a system memory and a hard drive (not shown) which may be utilized to store and retrieve software programs incorporating computer code that implements the present invention, data for use with the invention, and the like. Although the CD-ROM 940 is shown as an exemplary computer readable storage medium, other computer readable storage media including floppy disk, tape, flash memory, system memory, and hard drive may be utilized.

The invention can be implemented by software, hardware or a combination of hardware and software. The invention can also be embodied as computer readable code on a computer readable medium. The computer readable medium is any data storage device that can store data which can thereafter be read by a computer system. Examples of the computer readable medium include read-only memory, random-access memory, CD-ROMs, DVDs, magnetic tape, and optical data storage devices. The computer readable medium can also be distributed over network-coupled computer systems so that the computer readable code is stored and executed in a distributed fashion.

The media items of emphasis in several of the above embodiments can be audio items (e.g., audio files or songs, audiobooks, and/or podcasts), videos (e.g., movies) or images (e.g., photos). The media items can also be multimedia items.

The various aspects, embodiments, implementations or features of the invention can be used separately or in any combination.

The many features and advantages of the present invention are apparent from the written description and, thus, it is intended by the appended claims to cover all such features and advantages of the invention. Further, since numerous modifications and changes will readily occur to those skilled in the art, the invention should not be limited to the exact construction and operation as illustrated and described. Hence, all suitable modifications and equivalents may be resorted to as falling within the scope of the invention.

The invention claimed is:

1. A method for displaying local media information and remote media information on a display screen associated with a computing device, said method comprising:
   obtaining local media information pertaining to local media items stored on a local media source;
   displaying the local media information on a first part of the display screen;
   selecting at least one of the local media information displayed on the display screen;
   determining at least one media type for remote information to be presented based on the selected local media information;
   determining an appropriate remote media presentation format, the remote media presentation format being determined from a plurality of available remote media presentation formats based upon the media type of the remote information to be presented;
   acquiring remote media information pertaining to remote media items stored on a remote media source; and
   displaying the remote media information on a second part of the display screen in accordance with the determined remote media presentation format, wherein the remote media information and the local media information are concurrently displayed on the display screen.

2. A method as recited in claim 1, wherein the determining at least one media type is based on a user selection corresponding to at least one of the local media items.

3. A method as recited in claim 2, wherein the determining at least one media type is dependent on availability of media items from the remote media source that match the selected at least one of the local media items.

4. A method as recited in claim 1, wherein the remote media source is a remote media store.

5. A method as recited in claim 1, wherein the local media source is integral with or proximate to the computing device.

6. A method as recited in claim 1, wherein the media items pertain to one or more of songs, audiobooks, podcasts, and videos.

7. A method for displaying local media information and remote media information on a display screen associated with a computing device, said method comprising:
   (a) obtaining local media information pertaining to local media items stored on a local media source;
   (b) displaying the local media information on a first part of the display screen;
   (c) receiving a user selection of one of the local media items by interacting with the local media information being displayed on the first part of the display screen;
   (d) distinguishably displaying at least a portion of the local media information corresponding to the one of the local media items selected by the user selection;
   (e) determining a media type for the one of the local media items selected by the user selection;
   (f) determining an appropriate remote media presentation format based on the determined media type, the remote media presentation format being determined from a plurality of available remote media presentation formats;
   (g) acquiring remote media information pertaining to remote media items stored on a remote media source; and
   (h) displaying the remote media information on a second part of the display screen in accordance with the appropriate remote media presentation format.

8. A method as recited in claim 7, wherein said determining (f) comprises:
   (f1) determining whether the remote media source stores media content corresponding to the one of the local media items selected by the user selection; and
   (f2) determining the appropriate remote media presentation format based on said determining (f1).

9. A method as recited in claim 8,
   wherein when the one of the local media items selected by the user selection is a song, said determining (f1) at least determines whether the remote media source stores an album associated to the song, and
   wherein said determining (f2) determines that the appropriate remote media presentation format is a first media presentation format when the remote media source is determined to store an album associated to the song.

10. A method as recited in claim 9,
    wherein said determining (f1) at least determines whether the remote media source stores media content from an artist associated to the song, and
    wherein said determining (f2) determines that the appropriate remote media presentation format is a second media presentation format when the remote media source is determined to store media content from the artist associated to the song.

11. A method as recited in claim 8,
    wherein when the one of the local media items selected by the user selection is a song, said determining (f1) at least determines whether the remote media source stores media content associated to the song,
    wherein said determining (f2) determines that the appropriate remote media presentation format is first media presentation format when the remote media source is determined to store media content associated to the song, and
    wherein said determining (f2) determines that the appropriate remote media presentation format is a second media presentation format when the remote media source is determined not to store any media content associated to the song.

12. A method as recited in claim 7, wherein the remote media source is an online media store.

13. A method as recited in claim 7, wherein the remote media information and the local media information are concurrently displayed on the display screen.

14. A method as recited in claim 7, wherein said acquiring (f) operates to acquire the remote media information from the remote media source based on the user selection.

15. A computing system capable of displaying media information, said computing device comprising:
    a data storage device that stores media content;
    a display device; and
    a processor for storing, accessing and presenting the stored media content from said data storage device, said processor being configured to: (i) obtain local media information pertaining to local media items stored on a local media source; (ii) display the local media information on a first part of the display device; (iii) select at least one of the local media information displayed on the display screen; (iv) determine at least one media type for the remote media information to be displayed based on the selected local media information; (iv) determine an appropriate remote media presentation format, the appropriate remote media presentation format being determined from a plurality of available remote media presentation formats based upon the determined media type; (vi) acquire remote media information pertaining to remote media items stored on a remote media source; and (vii) display the remote media information on a second part of the display device in accordance with the appropriate remote media presentation format, wherein the remote media information and the local media information are concurrently displayed on the display device.

16. A computer readable medium including at least executable computer program code tangibly stored therein for displaying local media information and remote media information on a display screen associated with a computing device, said computer readable medium comprising:
    computer program code for obtaining local media information pertaining to local media items stored on a local media source;
    computer program code for displaying the local media information on a first part of the display screen;
    computer program code for receiving a user selection of one of the local media items by interacting with the local media information being displayed on the first part of the display screen;
    computer program code for distinguishably displaying at least a portion of the local media information corresponding to the one of the local media items selected by the user selection;
    computer program code for determining at least one media type for remote information to be presented based on the one of the local media items selected by the user selection;
    computer program code for determining an appropriate remote media presentation format based on the user selection, the appropriate remote media presentation format being determined from a plurality of available remote media presentation formats based upon the media type of the remote information;

computer program code for acquiring remote media information pertaining to remote media items stored on a remote media source; and computer program code for displaying the remote media information on a second part of the display screen in accordance with the appropriate remote media presentation format.

17. A computer system including at least executable computer program code tangibly stored therein for displaying media information on a display screen associated with a computing device, said system comprising:

means for obtaining local media information pertaining to local media items stored on a local media source;

means for displaying the local media information on a first part of the display screen;

means for receiving a user selection of one of the local media items by interacting with the local media information being displayed on the first part of the display screen;

means for distinguishably displaying at least a portion of the local media information corresponding to the one of the local media items selected by the user selection;

means for determining at least one media type for local media information to be presented based on the one of the local media items selected by the user selection;

means for determining an appropriate remote media presentation format based on the user selection, the appropriate remote media presentation format being determined from a plurality of available remote media presentation formats based upon the media type of the local media information to be presented;

means for acquiring remote media information pertaining to remote media items stored on a remote media source; and means for displaying the remote media information on a second part of the display screen in accordance with the appropriate remote media presentation format.

* * * * *

UNITED STATES PATENT AND TRADEMARK OFFICE
CERTIFICATE OF CORRECTION

PATENT NO. : 7,774,708 B2
APPLICATION NO. : 11/398354
DATED : August 10, 2010
INVENTOR(S) : Chris Bell et al.

It is certified that error appears in the above-identified patent and that said Letters Patent is hereby corrected as shown below:

On the Title page, Item (56), in column 2, in "Primary Examiner", line 1, delete "Tadeese" and insert -- Tadesse --, therefor.

On Title page 2, Item (56), in column 2, under "Other Publications", line 3-4, delete "MacMillian" and insert -- MacMillan --, therefor.

On Title page 2, Item (56), in column 2, under "Other Publications", line 10, delete "Corporatin," and insert -- Corporation, --, therefor.

In column 14, line 32, in claim 15, delete "(iv)" and insert -- (v) --, therefor.

Signed and Sealed this
Twenty-second Day of November, 2011

David J. Kappos
*Director of the United States Patent and Trademark Office*